United States Patent [19]

Rayfield

[11] 4,147,203

[45] Apr. 3, 1979

[54] METHOD AND APPARATUS FOR CONTROLLING THE HEATING AND COOLING FUNCTION OF A HEAT PUMP SYSTEM

[76] Inventor: John F. Rayfield, P.O. Box 597, Hollister, Mo. 65672

[21] Appl. No.: 849,974

[22] Filed: Nov. 9, 1977

[51] Int. Cl.² ............................................. F25B 29/00
[52] U.S. Cl. .......................................... 165/2; 165/29
[58] Field of Search ...................... 165/2, 29; 237/2 B; 62/160

[56] References Cited

U.S. PATENT DOCUMENTS

| | | | |
|---|---|---|---|
| 3,157,227 | 11/1964 | Palmer | 165/29 |
| 3,993,121 | 11/1976 | Medlin et al | 62/160 |
| 4,055,963 | 11/1977 | Shoji et al. | 237/2 B |
| 4,112,705 | 9/1978 | Sisk et al. | 165/29 |

Primary Examiner—Louis J. Casaregola
Attorney, Agent, or Firm—Lowe, Kokjer, Kircher, Wharton & Bowman

[57] ABSTRACT

This invention discloses a method and apparatus for coupling and controlling the operable components of a heat pump system to effectively regulate the temperature within a controlled environment. The operable components of the heat pump system include an indoor thermostat for monitoring the temperature within the controlled environment, an outdoor heat pump for heating and cooling the controlled environment, and an indoor fossil fuel furnace for supplementing the heating capacity of the heat pump. These components are operably coupled through a master switching relay which is arranged to use the monitored temperature of the controlled environment to select the operating mode of the system thereby providing an economical and efficient central control point.

13 Claims, 1 Drawing Figure

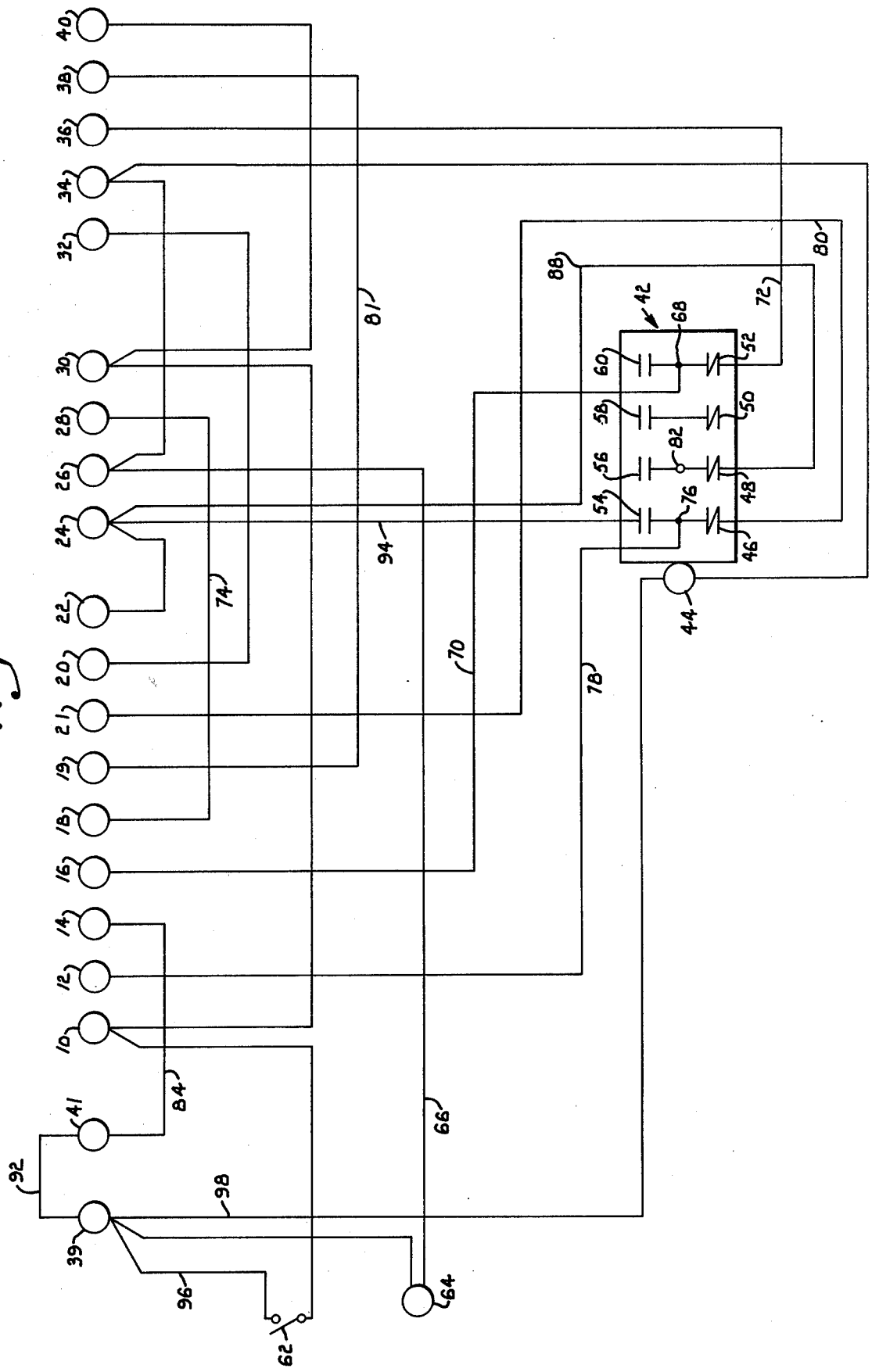

METHOD AND APPARATUS FOR CONTROLLING THE HEATING AND COOLING FUNCTION OF A HEAT PUMP SYSTEM

BACKGROUND AND BRIEF DESCRIPTION OF THE INVENTION

This invention relates in general to a method and apparatus for controlling the heating and cooling functions of a heat pump system to thereby effectively regulate the temperature within a controlled environment. In particular, this invention relates to a low-voltage control panel that electrically couples the low-voltage control sections of the operable components of a heat pump system so that the operating mode of the system is determined by the monitored temperature of the controlled environment.

A heat pump heating and cooling system normally includes an indoor thermostat which monitors the temperature of the environment being controlled, an outdoor heat pump which is operable to heat and cool the environment being controlled, and an indoor heating unit which is operable to supplement the heating capacity of the heat pump.

The heating efficiency of an outdoor heat pump is directly related to the outdoor temperature. In other words, the heating capacity of the heat pump decreases as the outdoor temperature drops. Since the heating capacity of a heat pump is temperature dependent and since the heating load in most areas is greater than the cooling load, the heat pump system is normally equipped with an indoor heating unit to supplement the heating capacity of the outdoor heat pump. Typically, the indoor heating unit is comprised of resistance heaters that produce heat by passing an electric current through a resistant. This method of heat generation is highly inefficient and extremely costly to operate. A more efficient and less costly method for supplementing the heating capacity of the outdoor heat pump is to use a fossil fuel furnace. While a fossil fuel furnace is more efficient and economical than resistance heaters, it is not as efficient or economical as the heat pump itself. Therefore, it is desirable to make maximum use of the outdoor heat pump in order to improve the overall operating efficiency of the heating system thereby minimizing heating costs. As the availability of fossil fuels decreases and as the price of these fuels increases, it will become even more critical from an environmental and cost standpoint to make the most efficient use of our remaining fuel reserves.

My invention provides a unique method and apparatus for coupling and controlling the operable components of a heat pump system in a manner that makes the most efficient use of the components of the heating system. In particular, the present invention comprises a low-voltage heat pump control panel that is of standard design and suitable for use in a heat pump system comprising an indoor thermostat, an outdoor heat pump and an indoor fossil fuel furnace. The low-voltage control panel of the present invention utilizes a single master switching relay to interconnect the operating components of the system so that the operating mode of the system is selected in accordance with the temperature within the controlled environment. By using the temperature of the controlled environment to select the operating mode of the system. The operable components of the heating system can be coupled and controlled in a highly efficient manner at a relatively low cost.

The low-voltage control panel of my invention is further arranged to effectively remove the outdoor heat pump from the system if the unit experiences operating problems. An emergency heat switch controls the switching state of the master switching relay. Closure of the emergency heat switch causes the master switching relay to change states thereby placing the system in the emergency heat mode. In the emergency heat mode, the outdoor heat pump is effectively removed from the system and full heating responsibility is transferred to the fossil fuel furnace.

It is therefore an object of the present invention to provide a method and apparatus for interconnecting the low-voltage control sections of the heating and cooling components of a heat pump system comprising an indoor thermostat for monitoring the temperature of the controlled environment, an outdoor heat pump for heating and cooling the controlled environment and an indoor fossil fuel furnace for supplementing the heating capacity of the heat pump.

A further object of the present invention is to provide a method and apparatus for operably coupling the low-voltage control sections of the heating and cooling components of a heat pump system which is of standard design and can be manufactured and sold at a relatively low cost.

A further object of the present invention is to provide a low cost method and apparatus for interconnecting the low-voltage control sections of the heating and cooling components of a heat pump system which efficiently controls the overall operation of the system.

Another object of the present invention is to provide a low cost and highly efficient method and apparatus for interconnecting the low-voltage control sections for the heating and cooling components of a heat pump system that selects the operating mode of the system in accordance with the temperature of the controlled environment.

An additional object of the present invention is to provide a low cost and highly efficient method and apparatus for interconnecting the low-voltage control sections of the heating and cooling components of a heat pump system which use a single master switching relay having two switching states one of which effectively removes the outdoor heat pump from the system.

It is a further object of the present invention to provide a low cost and highly efficient method and apparatus for interconnecting the low-voltage control sections of the heating and cooling components of a heat pump system which includes an emergency heat switch that is operable to control the switching state of the master control relay.

Other and further objects of the invention, together with the features of novelty appurtenant thereto, will appear in the course of the following description of the drawings.

DETAILED DESCRIPTION OF THE INVENTION

In the accompanying drawing which forms a part of the specification and is to be read in conjunction therewith, the single FIGURE is designated FIG. 1 and is a detailed schematic drawing of the low-voltage control panel of the present invention.

Referring now to FIG. 1, the low-voltage control panel of the present invention is provided with a terminal block made up of terminal contacts to which the operable components of the heat pump system are connected. Terminals 10, 12, 14, 16 and 18 provide a means for electrically coupling the indoor thermostat to the control panel of the present invention. Terminals 19 and 21 and terminals 20 and 22 are respectively coupled to the compressor limit switch and the burner limit switch which are thermostatic switches located in the heated air flow. The low-voltage control section of the indoor fossil fuel furnace is electrically connected to the control panel by means of terminals 24, 26, 28 and 30. Similarly, the outdoor heat pump is electrically coupled to the control panel by means of terminals 32, 34, 36, 38 and 40. The indoor thermostat, outdoor heat pump, and indoor fossil fuel furnace are all of conventional design but the indoor thermostat must be capable of presetting a maximum cooling temperature and two minimum heating temperatures. The thermostat must also be operable to provide a cooling signal when the temperature within the controlled environment exceeds the preset maximum temperature, a first heat activation signal when the temperature within the controlled environment drops below the first preset minimum temperature and a second heat activation signal when the temperature drops below the second minimum temperature.

The operable components of the heat pump system are electrically coupled and controlled through the master switching relay which is generally designated by the numeral 42. This relay is a plug-in type of relay having eight switching contacts which change state when an energization signal is provided to relay coil 44. As shown in FIG. 1, master relay 42 is in its normal switching state wherein contacts 46, 48, 50 and 52 are in a normally closed position while contacts 54, 56, 58 and 60 are in a normally open position. Emergency heat switch 62 is provided to initiate the emergency heat mode of operation by energizing relay coil 44 causing master relay 42 to change states. In the emergency heat mode of operation, the normally open contacts are closed while the normally closed contacts are opened thereby effectively removing the outdoor heat pump from the system. Indicator lamp 64 is provided to show when the system is in the emergency heat mode.

In operation, a 24 volt power signal is present at output terminal 10. When the indoor thermostat is properly wired to the low-voltage control panel of the present invention, the 24 volt power signal present at output terminal 10 is supplied to the thermostat to provide operating power to this component. The 24 volt power signal is similarly provided to the low-voltage control circuits of the indoor furnace and the outdoor heat pump by means of output terminals 30 and 40 respectively. The 24 volt power signal is also provided to the emergency heat switch 62 by means of conductor line 66. The emergency heat switch is shown in an open condition which represents the normal mode of operation. Terminal contacts 26 and 34 provide a common ground for the control panel.

If the heat pump system is set to cool the controlled environment, the indoor thermostat provides a cooling signal to contact terminal 16 when the temperature in the controlled environment exceeds the preset maximum temperature. This signal is then sent to terminal 68 of master switching relay 42 by means of conductor line 70. After passing through normally closed contact 52, this signal is provided to output terminal 36 by means of conductor line 72. Output terminal 36 is electrically connected to a corresponding terminal on the heat pump and the presence of a cooling signal at this terminal energizes the compressor of the heat pump, thereby activating the cooling operation of this unit. A fan activation signal is simultaneously provided to input terminal 18. This signal is sent by means of conductor line 74 to output terminal 28 where it energizes the indoor fan relay thus activating the indoor fan.

In the heating mode of operation, the indoor thermostat provides a first heat activation signal to input terminal 12 if the temperature within the controlled environment drops below the first preset minimum temperature. The first heat activation signal is provided continuously to terminal 12 until the monitored temperature rises above the first minimum temperature setting.

The first heat activation signal is sent from input terminal 12 to terminal 76 of master switching relay 42 by means of conductor line 78. When the master switching relay is in its normal switching state as shown in FIG. 1, the first heating signal is sent through normally closed contact 46 to output terminal 21 by means of conductor line 80. Output terminal 21 is electrically coupled to the compressor limit switch which is not shown in this figure. The compressor limit switch is a thermostatic switch which is provided to protect the heat pump from heat damage during the heating cycle. The heat pump's compressor can be severely damaged if the heating coil is exposed to extreme heat while the heat pump is operating in the heating mode. Exposure of the heating coil to heat above a selected value causes pressure to be generated in the heating coil. If the heat pump is operating, this pressure is transmitted to the heat pump where it can damage the compressor or cause the unit to be shut off by a high pressure cutoff switch if the unit is so equipped. The compressor limit switch is located near the heating coil and provides the first heating signal to the heat pump only if the temperature near the heating coil is below a preset level. The compressor limit switch is normally closed but produces an open circuit if the temperature near the coil exceeds the present temperature. If the temperature near the coil is below the temperature present on the compressor limit switch, the first heat activation signal passes through this switch and is provided to input terminal 19. The first heat activation signal is then sent by conductor line 81 to output terminal 38 where it activates the heating operation of the heat pump.

Master switching relay 42 also provides the first heat activation signal to normally open contact 54 where the signal is terminated in the normal operation state. A fan activation signal is provided to input terminal 18 in conjunction with the first heat activation signal. The fan activation signal is sent by means of conductor line 74 to output terminal 28 where it energizes the indoor fan relay thereby activating the indoor fan.

If the heating capacity of the heat pump is insufficient to prevent a further temperature drop within the controlled environment, the indoor thermostat provides a second heat activation signal to input terminal 14 once the temperature in the controlled environment drops below the second minimum temperature setting. This second heat activation signal is used to energize relay coil 44 causing master switching relay 42 to change states. The second heat activation signal is provided to relay coil 44 via conductor line 84, terminal 41, conductor line 92, terminal 39 and conductor line 98.

Once master switching relay 42 has switched states, normally closed contacts 46, 48, 50 and 52 are opened thereby interrupting transmission of the first heat activation signal to the outdoor heat pump by means of normally closed contact 46. However, normally open contacts 54, 56, 58 and 60 are simultaneously closed thereby transferring the first heat activation signal to output terminal 24 via normally open contact 54 and conductor line 94. It should be pointed out at this time that the first heat activation signal is provided by the thermostat to input terminal 12 as long as the temperature within the controlled environment is below the first minimum temperature and generation of a second heat activation signal does not effect generation of the first heat activation signal. Output terminal 24 is connected to the low-voltage control section of the fossil fuel furnace and the presence of a heat activation signal at output terminal 24 activates the heating operation of this unit. In this way, the heating operation of the outdoor heat pump is terminated and full heating responsibility is shifted to the indoor furnace until the temperature within the controlled environment rises above the second minimum temperature setting.

Once the temperature rises above the second minimum temperature setting, the second heat activation signal provided to input terminal 14 is removed thereby deactivating relay coil 44 causing master switching relay 42 to return to its normal condition. In this condition, the first heat activation signal is removed from output terminal 24 and transferred to output terminal 21. If the temperature near the heat coil is below the temperature set on the compressor limit switch, the first heat activation signal passes through this switch and is provided to output terminal 38 causing the heating operation of the heat pump to be activated. If, on the other hand, the temperature near the compressor exceeds the temperature set on the compressor limit switch, the compressor limit switch inhibits the heat activation signal until the temperature drops below the critical temperature.

In this way, the compressor limit switch allows the heating coil to cool before activating the heating operation of the heat pump thereby protecting the compressor of the heat pump from damage.

If the temperature within the controlled environment rises above the first minimum temperature, the first heat activation signal is removed and the heating operation of the heat pump is terminated. The fan activation signal is likewise terminated causing the indoor fan to be shut off.

If the heat pump initiates its defrost cycle while it is in the heat mode of operation, it provides a supplementary heat activation signal to input terminal 32. The supplementary heat signal is present only during the defrost cycle and is used to activate the heating operation of the indoor fossil fuel furnace in order to provide a supplementary heat during the defrost cycle. This signal is transmitted to the indoor fossil fuel furnace via conductor line 91, output terminal 20, the burner limit switch (not shown in FIG. 1), input terminal 22, conductor line 90 and output terminal 24. The limit switch is a thermostatic switch which is provided to protect the heat pump from damage by restricting the heat capacity of the furnace. Since the compressor of the heat pump is running during the defrost cycle, the compressor of the heat pump can be severely damaged by the pressure produced in the heating coil by the heat from the indoor furnace. The burner limit switch is located near the heating coil and is operable to shut off the furnace once the preset cutoff temperature is reached. Once the temperature drops below the cutoff temperature the limit switch closes reactivating the indoor furnace. In this way, the burner limit switch keeps the temperature around the coil below the preset cutoff temperature thereby protecting the compressor of the heat pump from damage.

Closure of emergency heat switch 62 provides an energization signal to relay coil 44 via conductor line 96, terminal 39, and conductor line 98. Energization of relay coil 44 causes the master switching relay 42 to switch from its normal operating state to the emergency heat state wherein normally closed contacts 46, 48, 50 and 52 are open while normally open contacts 54, 56, 58 and 60 are simultaneously closed. In this switch state, the heat pump is effectively removed from the system thereby transferring full heating responsibility to the indoor fossil fuel furnace. An energization signal is also provided to indicator lamp 64 signifying that the heat pump system is operating in the emergency heat mode.

Thereafter, a heat activation signal provided to input terminal 12 is transmitted directly to output terminal 24 thereby activating the heating operation of the indoor fossil fuel furnace directly. This signal is transmitted to output terminal 24 via conductor line 78, normally open contact 54, and conductor line 94. In this mode of operation, a heat activation signal provided to input terminal 12 activates the heating operation of the indoor fossil furnace rather than the heating operation of the outdoor heat pump. If the temperature within the controlled environment drops below the second minimum temperature setting and a second heat activation signal is provided to input terminal 14, this signal will not affect the operation of the system since relay coil 44 is already energized.

Additional methods of control can be obtained by merely varying the wiring configuration of the control panel shown in FIG. 1. For example, selection of the operating mode of the system can be made contingent upon the outdoor temperature rather than the temperature within the controlled environment simply by removing conductor line 92 and connecting an outdoor thermostat to terminal 39.

In this configuration, the cooling operation of the heat pump is activated as described above. Similarly, the indoor thermostat provides a heat activation signal to input 12 whenever the temperature within the controlled environment drops below a preset minimum temperature. The heat activation signal is then provided to terminal 76 of the master switching relay 42 by means of conductor line 78. If the outdoor temperature is above the balance point temperature set on the outdoor thermostat, the master switching relay is in its normal switching state as shown in FIG. 1 and the heat activation signal is provided to the outdoor heat pump via normally closed contact 46, conductor line 80 and output terminal 38. However, if the outdoor temperature drops below the balance point temperature, a switch activation signal is provided to input terminal 39 from the outdoor thermostat. This signal is then provided to relay coil 44 by means of conductor line 98 causing the relay to be energized. Energization of relay coil 44 changes the switch state of master switching relay 42 thereby terminating transmission of the heat activation signal to the heat pump through normally closed contact 46 and transferring the signal to the indoor furnace via normally open contact 54, conductor line 94 and output terminal 24. Thereafter, the indoor furnace remains on until the temperature within the controlled environment rises above the minimum temperature setting or the outdoor temperature rises above the balance point temperature. The balance point temperature is determined in accordance with the size, structure, and construction of the building and the type of heat pump being used. In the emergency heat mode of operation, the heat activation signal is provided directly to the indoor furnace by means of conductor line 78, normally open contact 54, conductor line 94 and output terminal 82 without regard to the outdoor temperature.

If the heating coil of the heat pump is installed in the return air duct, the furnaces and heat pump can be operated at the same time without fear of damaging the coil from the heat generated by the furnace. In this embodiment of the invention, conductor line 84 is removed, an additional conductor line is run from input terminal into terminal 82 of the master switching relay 42, a burner limit switch is not used so that terminals 20 and 22 are left unconnected, a compressor limit switch is not used, and terminals 19 and 21 are electrically connected to each other. In this configuration, the cooling operation of the heat pump is initiated as described above. The heating operation of the outdoor heat pump is initiated in response to receipt of a first heat activation signal at input terminal 12. This signal is produced by the indoor thermostat if the temperature within the controlled environment drops below the first minimum temperature setting. In the normal mode of operation, the first heat activation signal is provided to output terminal 38 by means of conductor line 78, normally closed contact 46, conductor line 80, terminal 21, the conductor line installed between terminals 21 and 19, terminal 19, conductor line 81 and output terminal 38. A continued drop in the temperature within the controlled environment causes the indoor thermostat to provide a second heat activation signal to input terminal 14. This signal activates the heating operation of the indoor furnace if the master switching relay is in its normal operating state as shown in FIG. 1. The second heat activation signal is provided to terminal 82 of the master switching relay by means of the conductor line added between terminals 14 and 82 in this embodiment of the invention. The signal passes through normally closed contact 48 and is then sent to output terminal 24 via conductor line 88. In this way, the heating operations of the indoor furnace and outdoor heat pump are occurring simultaneously. Placement of the system in the emergency heat mode, on the other hand, effectively removes the outdoor heat pump from the system and transfers full heating responsibility to the indoor furnace. In this mode of operation, a first heat activation signal is provided directly to the indoor furnace by means of input terminal 12, conductor line 78, normally open contact 54, conductor line 94 and output terminal 24. The generation of a second heat activation signal by the indoor thermostat has no effect on the operation of the system since normally closed contact 48 is now open and normally open contact 56 is not connected to anything.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A low voltage control apparatus for use in a heat pump heating and cooling system operable to regulate the temperature within a controlled environment, said heat pump system comprising an indoor thermostat operable to generate a cooling signal when the temperature within the controlled environment rises above a preset maximum temperature, a first heating signal when the temperature within the controlled environment drops below a first preset minimum temperature, and a second heating signal when the temperature within the controlled environment drops below a second preset minimum temperature that is lower than said first minimum temperature; an outdoor heat pump operable to heat and cool the controlled environment; and an indoor fossil fuel furnace operable to supplement the heating capacity of said outdoor heat pump, said low voltage control apparatus comprising:

terminal means for operably coupling the control panel with said indoor thermostat, said heat pump, and said fossil fuel furnace; and means for operably coupling said terminal means, said coupling means being arranged to activate the cooling operation of said heat pump in response to said cooling signal, to activate the heating operation of said heat pump in response to said first heating signal, and to activate the heating operation of said indoor fossil fuel furnace while simultaneously terminating the heating operation of said outdoor heat pump in response to said second heating signal.

2. The invention in claim 1 wherein said coupling means is comprised of a master switching relay means having first and second switching states, said first switching state being arranged to operably couple all of the components of the heat pump system so that the cooling operation of said heat pump is activated in response to said cooling signal, the heating operation of said heat pump is activated in response to said first heating signal, and the heating operation of said indoor fossil fuel furnace is activated while the heating operation of said outdoor heat pump is simultaneously terminated in response to said second heating signal, and said second switching state being arranged to effectively remove said heat pump from the system thereby transferring all of the heating load to the fossil fuel furnace so that the cooling operation of said heat pump is activated in response to said cooling signal and the heating operation of said fossil fuel furnace is activated in response to said first heating signal.

3. The invention in claim 2 including switch means for controlling the switch state of said master switching relay means.

4. The invention in claim 1 wherein said heat pump includes a heating coil for heating and cooling the air in the controlled environment.

5. The invention in claim 4 including means for inhibiting the heating operation of said heat pump if the temperature around said heating coil is above a preselected temperature.

6. The invention in claim 4 wherein said heat pump has a defrost mode of operation and includes means for activating the heating operation of said fossil fuel furnace during said defrost mode of operation.

7. The invention in claim 6 including means for inhibiting the heating operation said fossil fuel furnace if the temperature around said heating coil is above a preselected temperature.

8. A method for regulating the temperature within a controlled environment by means of a heat pump system comprising an indoor thermostat for monitoring the temperature within the controlled environment; an outdoor heat pump for heating and cooling the controlled environment, said heat pump having a coil for heating and cooling the air in the controlled environment; and an indoor fossil fuel furnace for supplementing the heating capacity of said heat pump, said method comprising the steps of establishing a maximum temperature,
establishing a first minimum temperature,
establishing a second minimum temperature that is lower than said first minimum temperature,
generating a cooling signal when the temperature in the contolled environment rises above the established maximum temperature,
generating a first heating signal when the temperature within the controlled environment drops below the established first minimum temperature,
generating a second heating signal when the temperature within the controlled environment drops below the established second minimum temperature,
activating the cooling operation of said heat pump in response to said cooling signal,
activating the heating operation of said heat pump in response to said first heat signal, and
activating the heating operation of the fossil fuel furnace while simultaneously terminating the heating operation of said heat pump in response to said second heating signal.

9. The method as in claim 8 including the step of transferring the full heating load to the fossil fuel furnace so that the heating operation of the fossil fuel furnace is activated in response to said first heating signal.

10. The method as in claim 8 including the step of inhibiting the heating operation of the heat pump if the temperature around the heating coil is above a preselected temperature.

11. The method as in claim 8 including the step of periodically initiating a defrost cycle during the heating operation of the heat pump.

12. The method as in claim 11 including the step of activating the heating operation of the fossil fuel furnace during said defrost cycle to supplement the heating capacity of the heat pump.

13. The method as in claim 12 including the step of inhibiting the heating operation of the fossil fuel furnace if the temperature around the heating coil is above a preselected temperature.